United States Patent
Liu

(10) Patent No.: US 9,117,194 B2
(45) Date of Patent: Aug. 25, 2015

(54) METHOD AND APPARATUS FOR OPERATING A FREQUENTLY ASKED QUESTIONS (FAQ)-BASED SYSTEM

(75) Inventor: Ding Liu, Lowell, MA (US)

(73) Assignee: Nuance Communications, Inc., Burlington, MA (US)

( * ) Notice: Subject to any disclaimer, the term of this patent is extended or adjusted under 35 U.S.C. 154(b) by 0 days.

(21) Appl. No.: 13/312,688

(22) Filed: Dec. 6, 2011

(65) Prior Publication Data

US 2013/0144890 A1 Jun. 6, 2013

(51) Int. Cl.
*G06F 17/30* (2006.01)
*G06Q 10/10* (2012.01)

(52) U.S. Cl.
CPC .......... *G06Q 10/10* (2013.01); *G06F 17/30684* (2013.01); *G06F 17/30705* (2013.01)

(58) Field of Classification Search
CPC ..................... G06F 17/30684; G06F 17/30705
USPC ......................................................... 707/749
See application file for complete search history.

(56) References Cited

U.S. PATENT DOCUMENTS

| | | | |
|---|---|---|---|
| 6,028,601 A * | 2/2000 | Machiraju et al. | 715/705 |
| 6,327,590 B1 * | 12/2001 | Chidlovskii et al. | 707/734 |
| 6,766,320 B1 | 7/2004 | Wang et al. | |
| 7,284,004 B2 | 10/2007 | Cooper et al. | |
| 7,606,714 B2 | 10/2009 | Williams et al. | |
| 8,255,793 B2 | 8/2012 | Chakrabarti et al. | |
| 9,015,097 B2 | 4/2015 | Liu | |
| 2002/0065845 A1 * | 5/2002 | Naito et al. | 707/500.1 |
| 2003/0028448 A1 | 2/2003 | Joseph et al. | |
| 2004/0111408 A1 | 6/2004 | Caudill et al. | |
| 2005/0076003 A1 * | 4/2005 | DuBose et al. | 707/1 |
| 2005/0080614 A1 | 4/2005 | Bennett | |
| 2006/0080107 A1 | 4/2006 | Hill et al. | |
| 2006/0100998 A1 | 5/2006 | Edwards | |
| 2006/0136455 A1 | 6/2006 | Wen et al. | |
| 2006/0149553 A1 | 7/2006 | Begeja et al. | |
| 2007/0124263 A1 | 5/2007 | Katariya et al. | |
| 2007/0136246 A1 | 6/2007 | Stenchikova et al. | |
| 2008/0071533 A1 | 3/2008 | Cave et al. | |
| 2008/0281814 A1 | 11/2008 | Calistri-Yeh et al. | |
| 2008/0294584 A1 | 11/2008 | Herz | |

(Continued)

FOREIGN PATENT DOCUMENTS

| WO | WO 2008/051747 | 5/2008 |
|---|---|---|
| WO | WO 2011/126458 | 10/2011 |

OTHER PUBLICATIONS

European Search Report in Application No. 12 195 753.4, Entitled Method and Apparatus for Operating a Frequently Asked Questions (FAQ)-Based System, dated Apr. 22, 2013.

(Continued)

*Primary Examiner* — Jensen Hu
(74) *Attorney, Agent, or Firm* — Hamilton, Brook, Smith & Reynolds, P.C.

(57) ABSTRACT

Typical frequently-asked question (FAQ) systems perform keyword searches on queries to a database of answers to deliver an answer to a user. The present invention searches a user generated query in a classifier trained to search a database of questions in a set of FAQs. The questions in the database correspond to answers. Upon finding a relevant question, the system returns the corresponding answer to the user. Searching the query against the questions generates more accurate results for the user.

30 Claims, 16 Drawing Sheets

(56) References Cited

U.S. PATENT DOCUMENTS

| | | | |
|---|---|---|---|
| 2009/0012873 | A1 | 1/2009 | Hamling et al. |
| 2009/0019026 | A1 | 1/2009 | Valdes-Perez et al. |
| 2009/0055184 | A1 | 2/2009 | Hebert |
| 2009/0070311 | A1 | 3/2009 | Feng |
| 2009/0228264 | A1 | 9/2009 | Williams et al. |
| 2010/0030769 | A1 | 2/2010 | Cao et al. |
| 2010/0030770 | A1 | 2/2010 | Cao et al. |
| 2010/0094629 | A1 | 4/2010 | Emori et al. |
| 2010/0145710 | A1 | 6/2010 | Tremblay |
| 2011/0145333 | A1 | 6/2011 | Hind |
| 2011/0238408 | A1 | 9/2011 | Larcheveque et al. |
| 2011/0238409 | A1 | 9/2011 | Larcheveque et al. |
| 2011/0320442 | A1 | 12/2011 | Faruquie et al. |
| 2013/0007055 | A1 | 1/2013 | Brown et al. |
| 2013/0018876 | A1 | 1/2013 | Chu-Carroll et al. |
| 2013/0226906 | A1 | 8/2013 | Lebrun et al. |
| 2013/0288219 | A1 | 10/2013 | Dheap et al. |
| 2014/0006012 | A1 | 1/2014 | Zhou et al. |
| 2014/0172757 | A1 | 6/2014 | Liu |
| 2014/0280169 | A1 | 9/2014 | Liu |

OTHER PUBLICATIONS

Wen-Yun Yang, Yunbo Cao, Chin-Yew Lin, A Structural Support Vector Method for Extracting Contexts and Answers of Questions from Online Forums, Proceedings of the 2009 Conference on Empirical Methods in Natural Language Processing, pp. 514-523, Singapore, Aug. 6-7, 2009, http://aclweb.org/anthology-new/D/D09/D09-1054.pdf.

Gao Cong, Long Wang, Chin-Yew Lin, Young-In Song, Yueheng Sun, Finding Question-Answer Pairs from Online Forums, SIGIR '08, Jul. 20-24, 2008, Singapore, http://courses.cs.byu.edu/~cs653ta/projs/rsh-papers/QA.pdf.

David Pinto, Michael Branstein, Ryan Coleman, W. Bruce Croft, Matthew King, Wei Li, Xing Wei, QuASM: A System for Question Answering Using Semi-Structured Data, JCDL '02, Jul. 13-17, 2002, Portland, Oregon, http://www.google.com/url?JCDL '02 Proceedings of the 2nd ACM/IEEE-CS joint conference on Digital libraries.

David Pinto, Andrew McCallum, Xing Wei, W. Bruce Croft, Table Extraction Using Conditional Random Fields, SIGIR '03, Jul. 28-Aug. 1, 2003, Toronto, Canada, http://people.cs.umass.edu/~mccallum/papers/crftable-sigir2003.pdf.

Xing Wei, Bruce Croft, Andrew McCallum, Table Extraction for Answer Retrieval, Information Retrieval Journal (IRJ), vol. 9, issue 5, pp. 589-611, Nov. 2006, http://people.cs.umass.edu/%7Emccallum/papers/TableExtraction-irj06.pdf.

Ashwini Pande, Table Understanding for Information Retrieval, Aug. 19, 2002, Blacksburg, VA, http://scholar.lib.vt.edu/theses/available/etd-08282002-151909/unrestricted/AshwiniPandeTableIR.pdf.

Carpineto, C. and Romano, G., "A Survey Of Automatic Query Expansion In Information Retrieval," *Journal ACM Computing Surveys (CSUR) Surveys Homepage Archive*, 44(1), Article 1: 1-50 (2012).

Wang, X. and Zhai, C., "Learn From Web Search Logs To Organize Search Results," Published in: *Proceeding SIGIR '07 Proceedings of the 30th Annual International ACM SIGIR Conference on Research and Development in Information Retrieval* Jul. 23-27, 2007—pp. 87-94.

* cited by examiner

METHOD AND APPARATUS FOR OPERATING A FREQUENTLY ASKED QUESTIONS (FAQ)-BASED SYSTEM

BACKGROUND OF THE INVENTION

Frequently asked question (FAQ) search systems typically employ implementations similar to search engines. FAQ systems receive a query and retrieve entries based on keywords of answers in a list of FAQs. Users often receive an answer or list of answers with reasonable relevance to the query, so FAQ search systems have remained relatively the same since their inception.

SUMMARY OF THE INVENTION

An embodiment of the present invention includes a method, or corresponding system or apparatus, for operating a frequently asked questions (FAQ)-based system. The method includes training a classifier based on questions corresponding to answers stored in the FAQ-based system and applying the classifier to a query to return an answer.

The method may further include determining relevance of words within the answers with respect to corresponding questions. In addition, training the classifier may include providing selected words, selected by a weight that represents the relevance of the words within the corresponding answers to the questions, as features to the classifier, where the selected words are chosen from among the words having higher relevance than other words.

The questions may be preexisting questions. The method may further include determining relevance of words within the answers with respect to corresponding questions, and still further include automatically generating supplemental questions based on words having higher relevance than other words. The supplemental questions may correspond to answers from which words of the supplemental questions were chosen. In one embodiment, the classifier is trained based on the preexisting questions and the supplemental questions.

Generating the supplemental questions may further include ranking words within the corresponding answers as a function of relevance to corresponding questions and may still further include incorporating a given number of the ranked words into the preexisting questions to create the supplemental questions. In one embodiment, the given number of ranked words is optionally adjustable or static.

Applying the classifier to return the answer may return multiple answers to a user. The classifier may be further trained in part as a function of a given answer chosen by the user. The method may further include adjusting rankings of questions and corresponding answers, based on a given answer chosen by the user from among multiple answers returned, for use in returning answers to similar or the same queries in the future.

Training the classifier may further include determining a highest ranking set of answers, and may still include creating features to provide to the classifier based on the queries and words of the highest ranking set of answers. The method further includes enabling receipt of the query from a human user or enabling receipt of the query from a machine user.

The method further include estimating a confidence level of the answer returned with respect to the query, and may still further include enabling an override to allow a human to provide an alternative answer in an event the confidence level of the returned answer is below a given threshold.

Applying the classifier may further be performed as a function of context that is identified by a given sequence of queries. In one embodiment, the query is a formerly received query. The method may further include identifying a change in context in a most recently received query and resetting the given sequence of queries, from which the context is based, to begin a new context with the newest query.

The method may further include applying weightings of decreasing value to words, used as factors for iteratively training the classifier, from within newest queries to within oldest queries in the given sequence of queries. The training may further be based on a combination of questions and answers. The training may further provide a higher weight to the questions than the answers.

Another embodiment of the present invention is a method, or corresponding system or apparatus, of monitoring context of queries in FAQ-based system includes analyzing a sequence of queries for a context, and determining, in a classifier, whether to update the context to reflect a most recent query in the sequence of queries or reset the context, the determining based on an analysis of (i) the most recent query in the sequence of queries in connection with the context and (ii) the most recent query in the sequence of queries independent of the context.

In one embodiment, determining whether to update the context to reflect the most recent query in the sequence of queries or reset the context may further include determining a first factor in a vector based on the query within the context and a second factor in the vector based on the query without the context, may still further include calculating a first metric based primarily on the first factor in the vector and secondarily on the second factor in the vector and a second metric based primarily on the second factor in the vector and secondarily on the first factor in the vector, may still further include updating a context of the query if the first metric is greater than or equal to the second metric, and may still further include resetting the context of the query if the second metric is greater than the first metric. In one embodiment, when the context may further be updated, the most recent query may be added to the context to form a context-weighted query.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

DETAILED DESCRIPTION OF THE INVENTION

A description of example embodiments of the invention follows.

Figure 1:
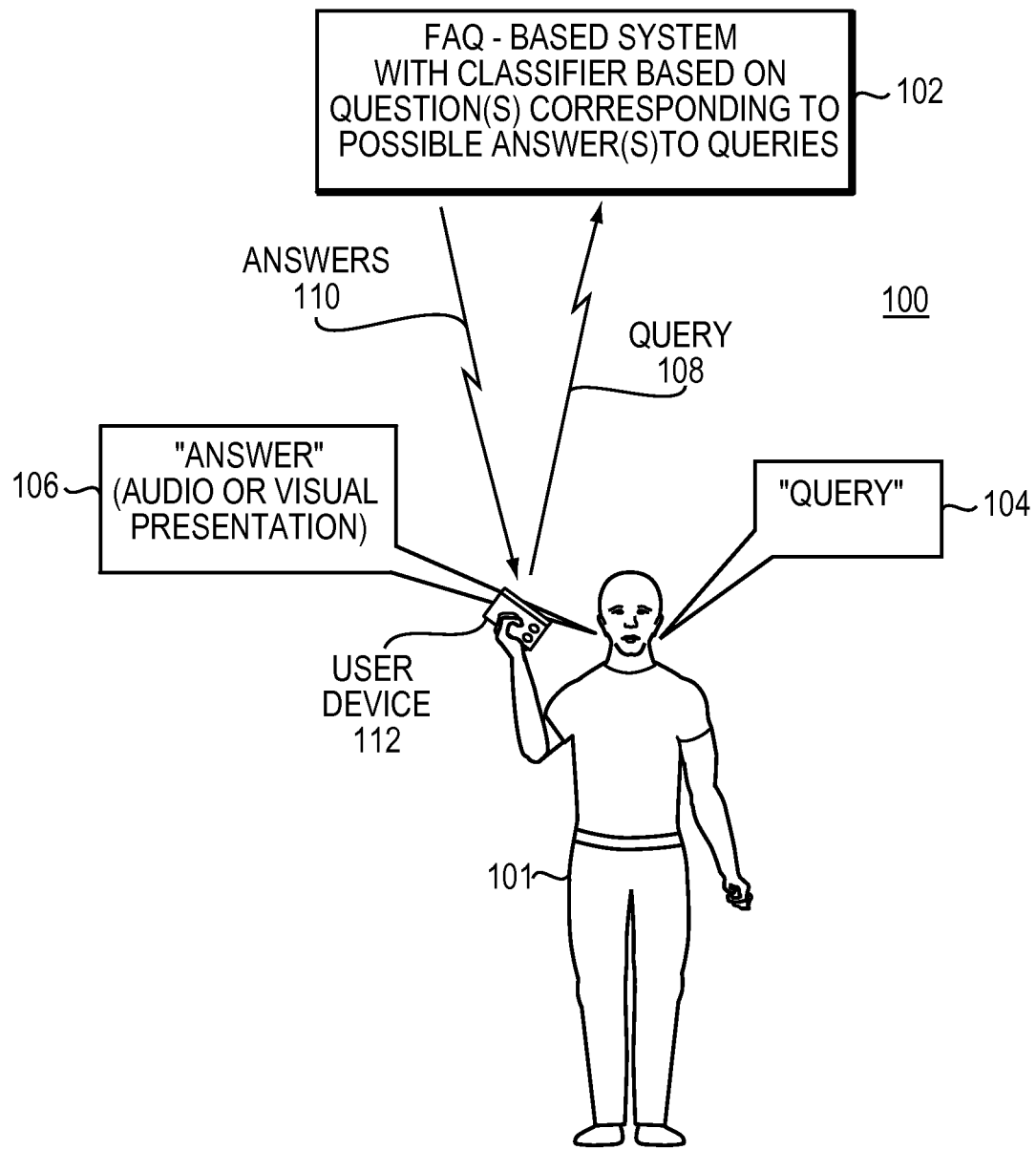
FIG. 1 is a diagram of a user interacting with a Frequently Asked Questions (FAQ)-based system.

FIG. 1 is a diagram illustrating an environment 100 in which a Frequently Asked Questions (FAQ)-based system 102 employing an embodiment of the present invention is used by a user 101. The FAQ-based system 102 includes a classifier (not shown) trained based on questions corresponding to possible answers to queries. The user 101 inputs a user generated query 104 into a user device 112. The user device 112 transmits the user generator query 104 as a transmitted query 108 to the FAQ-based system 102. The FAQ-based system returns a transmitted answer 110 to the user device 112. The user device 112 displays a system-generated answer 106 corresponding to the transmitted answer 110.

The user device 112 may be any device that receives the user generated query 104 in any form, including audible, visual or textual form, and outputs the system-generated answer 106 in any form, including an audible, visual, or textual form. Responsively, the user device 112 displays the system-generated answer 106 as an audio or visual presentation.

Figure 2:
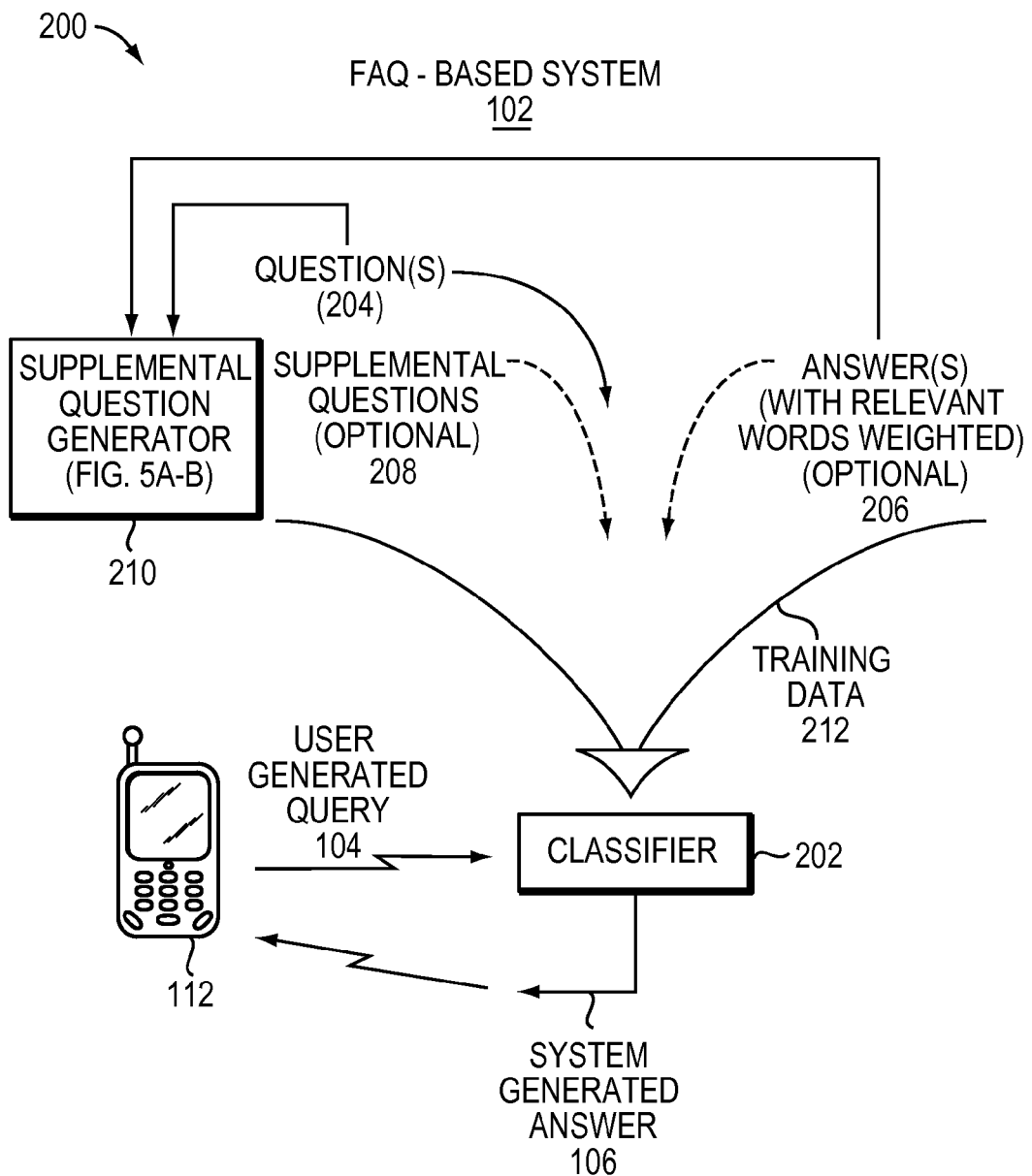
FIG. 2 is a flow diagram of a FAQ-based system training and usage.

FIG. 2 is a flow diagram of a FAQ-based system in which training and usage occurs. A classifier 202 of the FAQ-based system receives training data 212 as input to train the FAQ-based system 102. The classifier may employ learning technologies such as machine learning. The training data includes questions 204. The questions 204 may represent preexisting questions from a set of frequently-asked questions.

Optionally, the training data 212 includes answers 206. The answers 206 represent preexisting answers that correspond to the preexisting questions from the set of FAQs. The answers 206 include relevant words optionally weighted as part of the training data 212.

In addition, optionally, the training data 212 includes supplemental questions 208. A supplemental questions generator 210 generates the supplemental questions 208 from the questions 204 and the answers 206. The operation of the supplemental questions generator 210 is described in further detail below in reference to FIG. 5A and FIG. 5B.

After training, the classifier 202 receives the user generated query 104 as input and transmits as output the system-generated answer 106 to the user device 112.

Figure 3A:
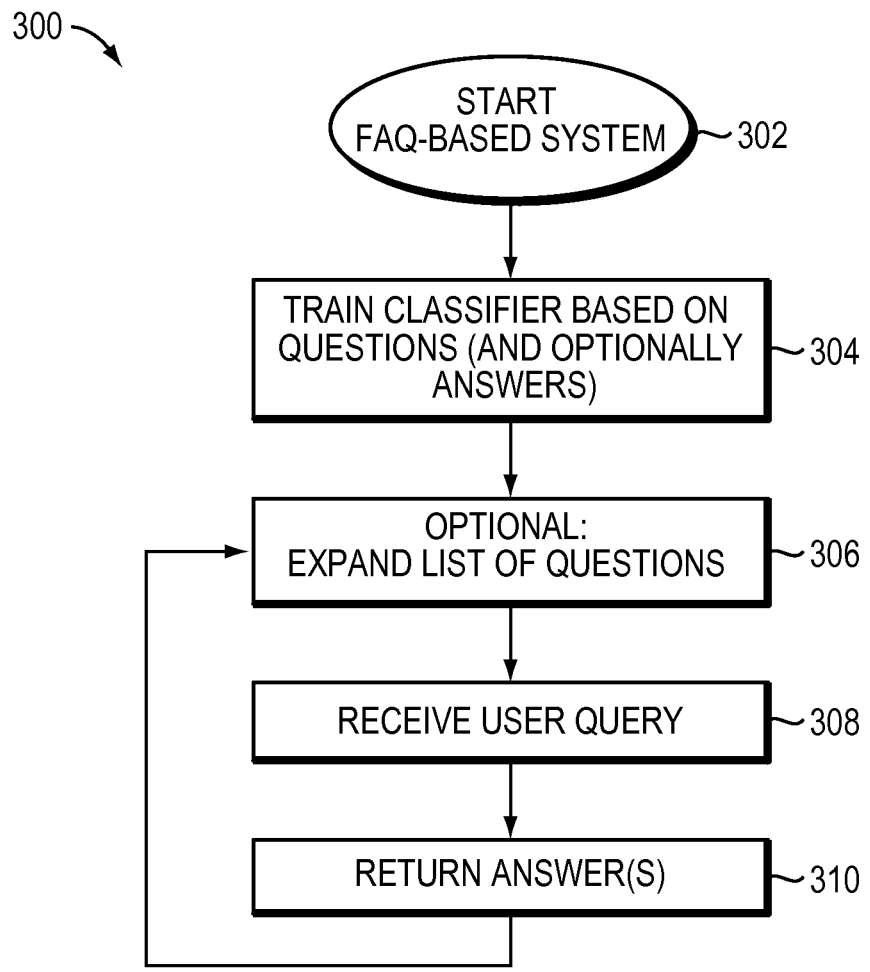
FIG. 3A is a flow diagram of operations performed by an embodiment of the invention.

FIG. 3A is a flow diagram of activities relating to the FAQ-based system according to an embodiment of the present invention. The FAQ-based system 102 starts by loading a question and answer database (302). The FAQ-based system then begins training the classifier (304). The classifier is trained based on questions and optionally answers from the question and answer database. Training the classifier based primarily on questions causes the classifier to return more accurate answers in response to the user generated query 104. Next, the system optionally expands its list of questions (306) by generating a set of supplemental questions based on the questions and answers that trained the classifier. The addition of the set of supplemental questions gives a more complete set of questions based on the data in the question and answer database.

After training the classifier, the system can receive user generated queries (308). The system responsively returns an answer to the user based on the user generated query 104. The classifier compares the received user query to the questions that the classifier was trained on to find corresponding answers that are relevant to the user generated query, but with higher than normal accuracy due to the training by use of questions.

Figure 3B:
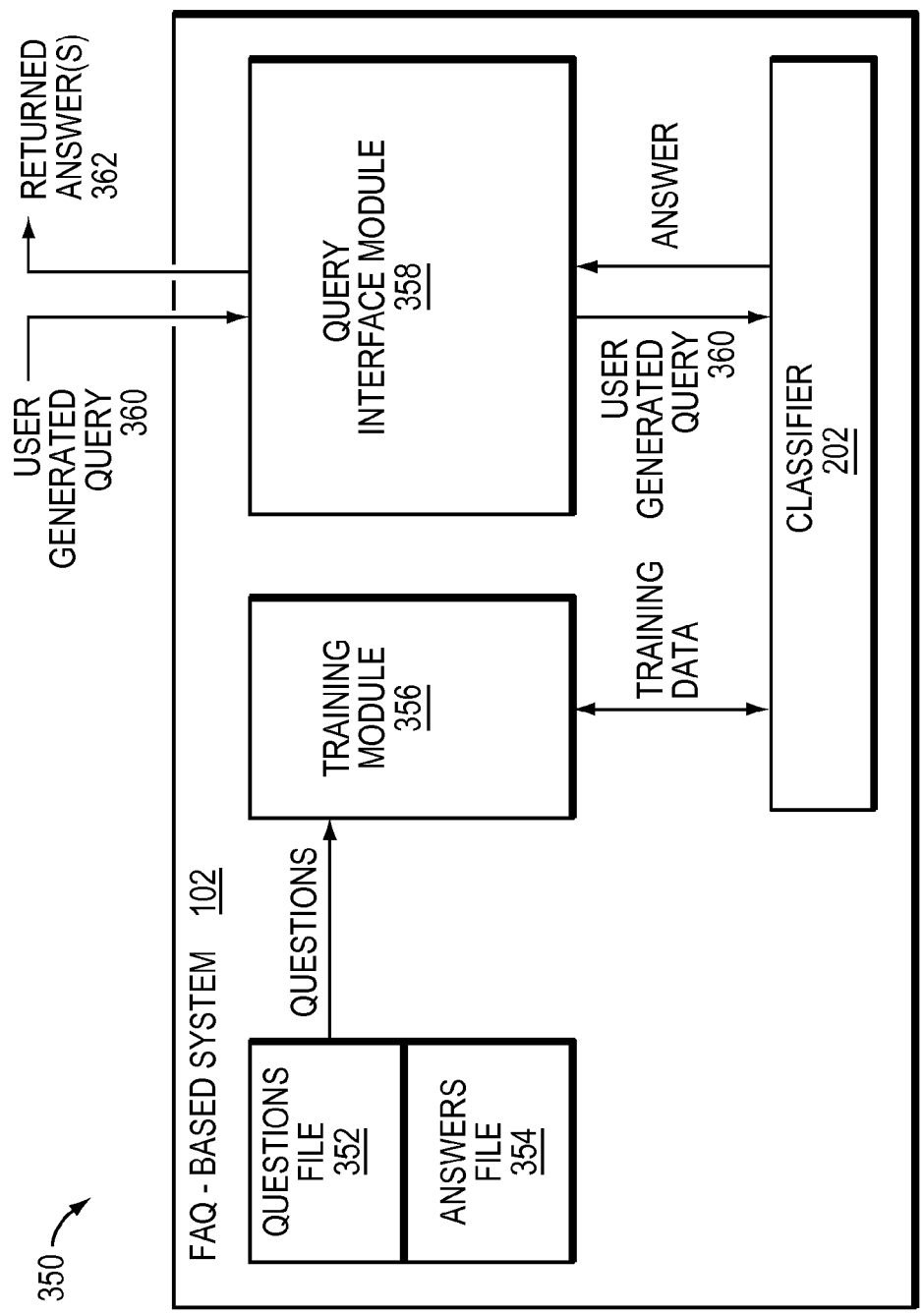
FIG. 3B is a block diagram of a FAQ-based system.

FIG. 3B is a block diagram of an embodiment of the FAQ-based system 350. The FAQ-based system includes a questions file 352, an answers file 354, as well as a training module 356, query interface module 358, and the classifier 202. In this embodiment, the training module 356 is coupled to the questions file 352 to receive the set of questions. The training module 356 is also coupled to the classifier 202 to train the classifier 202 based on the set of questions received from the questions file 352. After the training module 356 completes its training of the classifier 202, the FAQ-based system 102 can receive a user generated query 360. The user generated query 360 is received by the query interface module 358. The query interface module 358 forwards the user generated query 360 to the classifier 202. The classifier 202 searches for an answer to the query among the training data based on the set of questions to find a question or multiple questions closest to the query. The question(s) the classifier finds correspond to an answer in the answer file 354. The classifier 202 then returns the corresponding answer to the query interface module 358, which returns the answer(s) 362 to a user.

Figure 4:
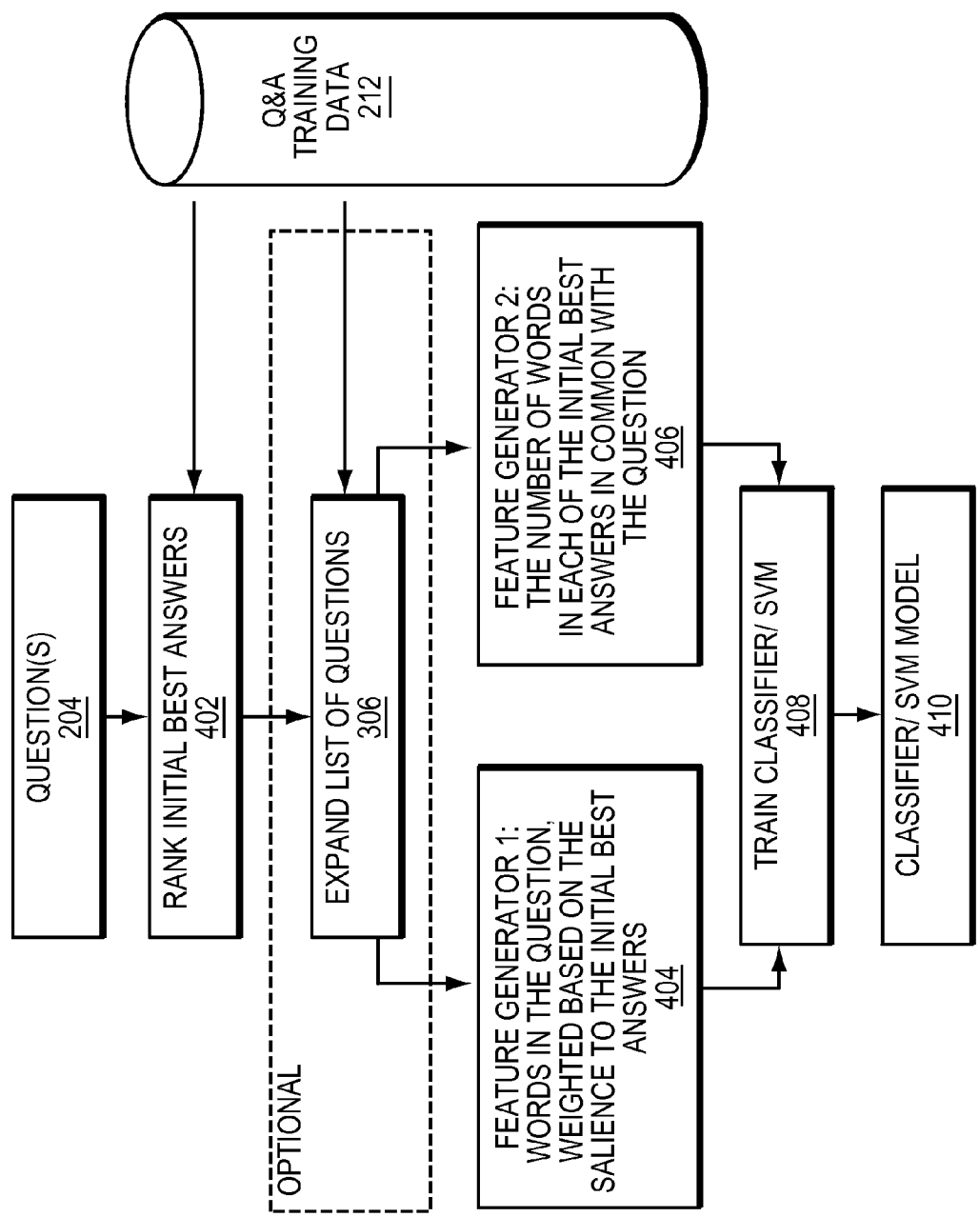
FIG. 4 is a flowchart of a method employed to provide FAQ-based system training.

FIG. 4 is a flow diagram corresponding to another embodiment of a method used to train the FAQ-based system training. Questions 204 and training data 212 are used to rank initial best answers (402), initially ranking the answers and questions from the training data 212 by performing a keyword search or applying another form of search. Optionally, the system expands the list of questions (306) by generating supplemental questions as described in reference to FIG. 3 above and described in more detail below in reference to FIGS. 5A and 5B. Continuing to refer to FIG. 4, first feature generator 404 and second feature generator 406 generate features based on the questions and answers. The first feature generator 404 weights words in the questions based on salience to the ranked answers generated by the ranking (402). The second feature generator 406 counts the number of words in each of the initial best answers generated by the ranking (402) in common with the question 204. Then, the system trains a classifier (not shown) (408) that uses the features generated by the first feature generator 404 and the second feature generator 406 to generate a classifier model 410. The classifier model 410 is used by the FAQ-based system 102 to search through the FAQs for a question(s) that is a close representative of the user query, using that question(s) to return a corresponding answer(s).

Figure 5A:
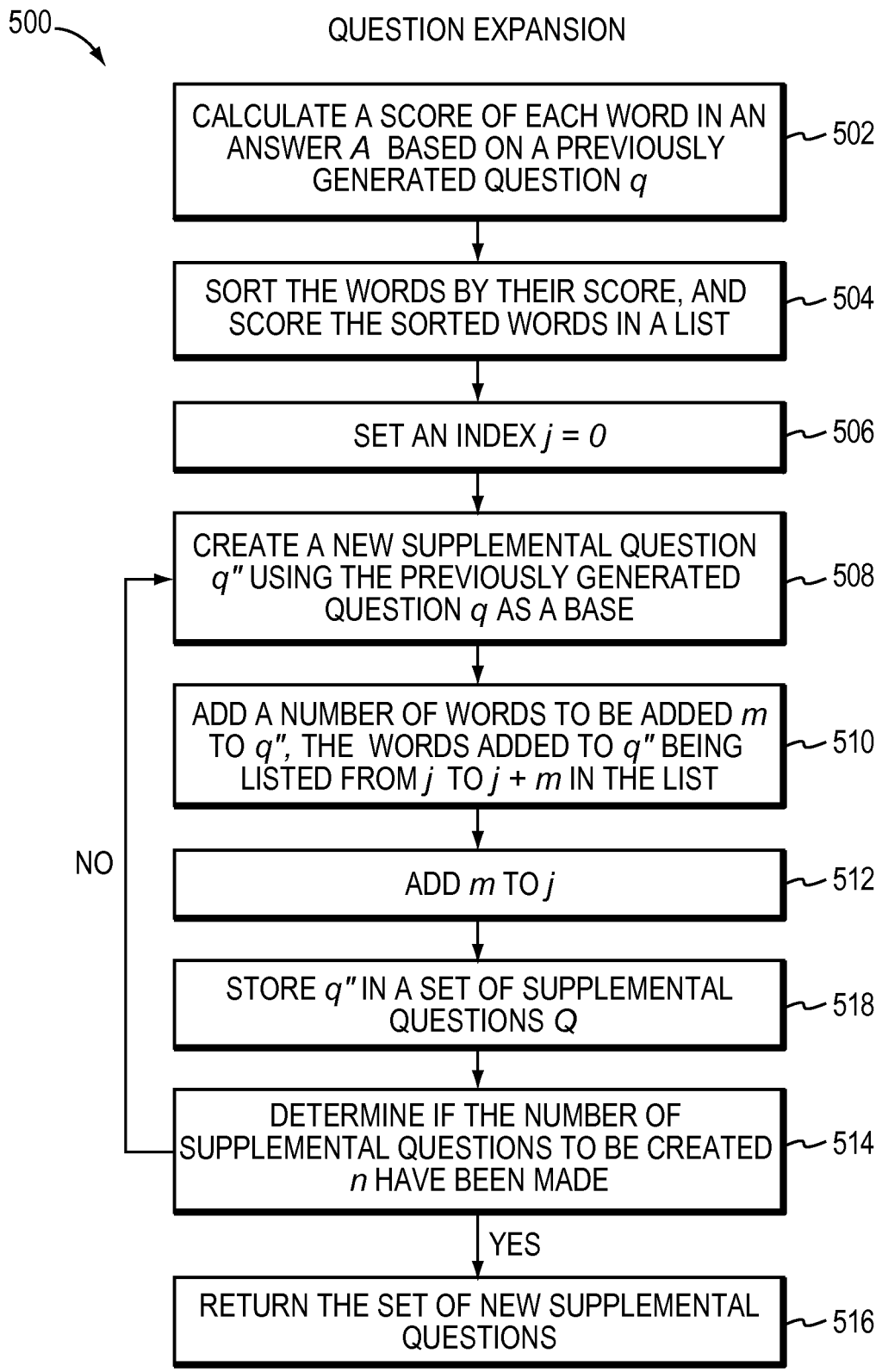
FIG. 5A is a flow diagram of a method optionally employed to provide question expansion.

FIG. 5A is a flow diagram 500 in which an embodiment of the present invention expands its list of questions. Question expansion begins by calculating a word score (502) of each word in a given answer based on the word's relevance to a previously generated question. The embodiment then sorts the words by score (504) and stores the sorted words in an ordered list or array.

The system thereafter initializes a general index (506) to zero and creates a new supplemental question using a particular previously generated question as a base (508). The base of the particular previously generated question is simply the particular previously generated question copied into the supplemental question.

The system may then add a finite number of words to the supplemental question(s) (510) from the scored (502) and sorted (504) list of words. The number of words added to each supplemental question is configurable. For example, the system can be configured to add two words to every supplemental question. However, the number of words added can be one, five, ten, or any other number.

The system then increases the index by the number of words added to the supplemental question.

The system then stores the supplemental question(s) (518) in a set of supplemental questions.

The system then determines whether the question expansion is completed (514) and terminates question expansion upon determining that a predetermined or dynamically determined (e.g., depending on complexity of questions, answers, or combinations thereof) number of supplemental questions were created. If the predetermined number of supplemental questions have not been created, the system creates more supplemental questions (508). After a predetermined number of supplemental questions have been created, the system returns the set of supplemental questions (516).

Figure 5B:
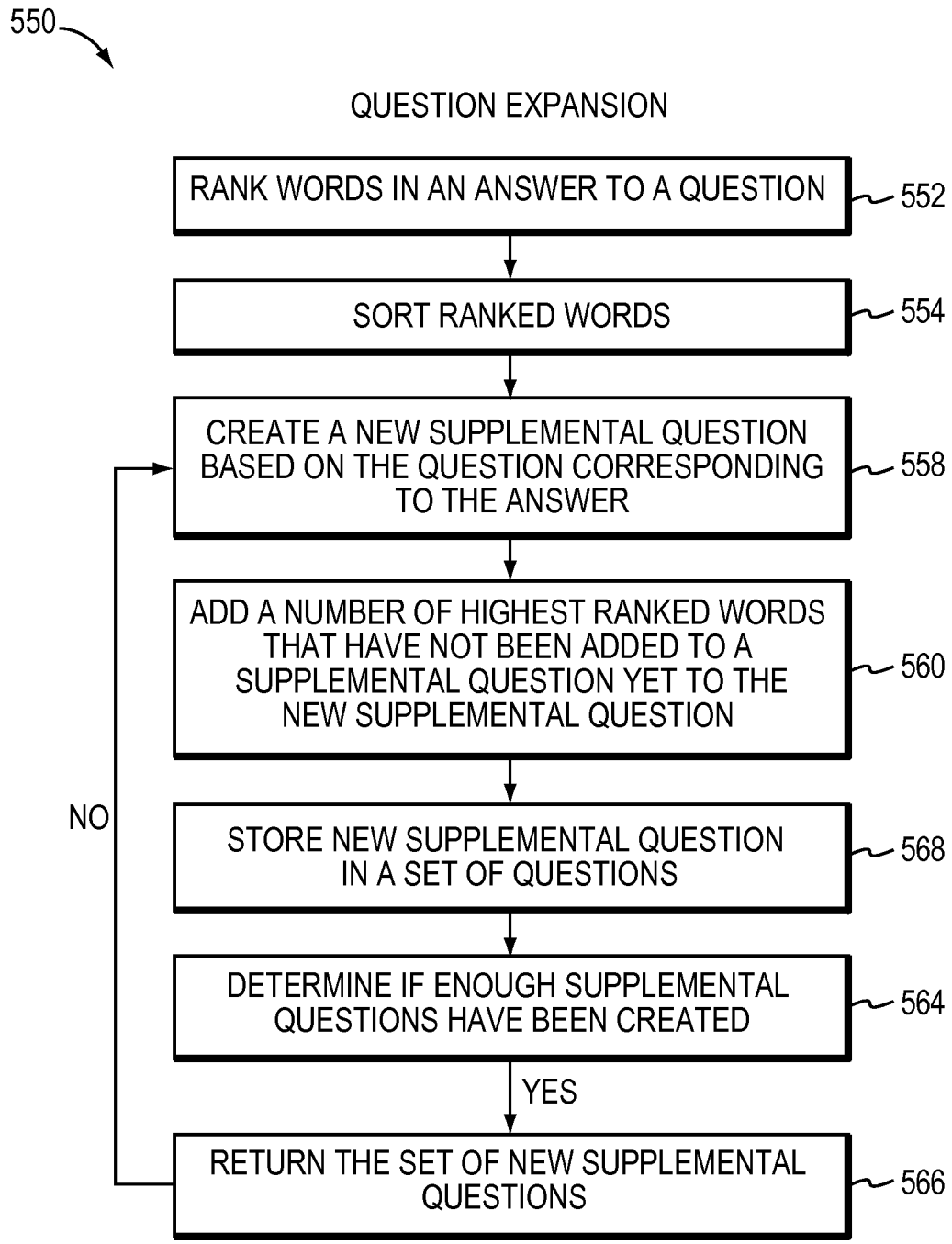
FIG. 5B is a flow diagram of a method optionally employed to provide question expansion.

FIG. 5B is a flow diagram 550 in which an embodiment of the invention expands its list of questions. Question expansion begins by ranking each word in answer to a question based on the relevance of the word in the answer to the question (552). The system then sorts (554) the ranked words (552).

The system then creates a new supplemental question based on a particular preexisting question corresponding to an answer (558). The supplemental question begins as a copy of the particular preexisting question. The system then adds a given number of highest ranked words that have not yet been added to a supplemental question to the most recent supplemental question (560).

The system thereafter stores the supplemental question in a set of supplemental questions (568). Then the system determines whether question expansion is completed (564). If question expansion is incomplete, the system creates a new supplemental question (558). If question expansion is complete, then the system returns the set of supplemental questions (566). In both question expansion embodiments illustrated referenced in FIGS. 5A and 5B, the following describes one example of the question expansion operation.

In an example embodiment, the FAQ-based system 102 adds two words to each supplemental question and generates five supplemental questions for each preexisting question, the system first generates a set of ranked words. It then creates a supplemental question initially identical to one of the preexisting questions and adds the two highest ranked words from the set of ranked words to the supplemental question. The supplemental question is now the preexisting question concatenated with the two highest ranked words from the ranked list. This supplemental question is stored in a set of supplemental questions.

The system determines whether it has generated enough supplemental questions. Since this system is configured to generate five supplemental questions, and this has only generated the first, it creates another supplemental question based on the same preexisting question, initially being identical to the preexisting question. In this iteration, another two words are added to the supplemental question; however, in this iteration, the two added words are the next two lowest words from the ranked list, i.e. the words ranked third and fourth. While in the first iteration, the supplemental question receives the first and second ranked words from the ranked list; in the second iteration, the supplemental question receives the third and forth ranked questions from the ranked list. This second supplemental question is then added to the set of supplemental questions. This process repeats three more times until the system determines that the question expansion is complete by reaching a fifth iteration.

In the third iteration, the supplemental question will include the fifth and sixth ranked words from the ranked list. In the fourth iteration, the supplemental question includes the seventh and eighth ranked words from the ranked list. Last, in the fifth iteration, the supplemental question includes the ninth and tenth ranked words from the ranked list. In this manner, the ten highest ranked additional words have been added into the question database through the five new supplemental questions. A person of ordinary skill in the art can appreciate that the number of supplemental questions being five and the number of words added to each supplemental question being two are examples and that any number of supplemental questions or additional words per supplemental questions can be used.

Figure 6:
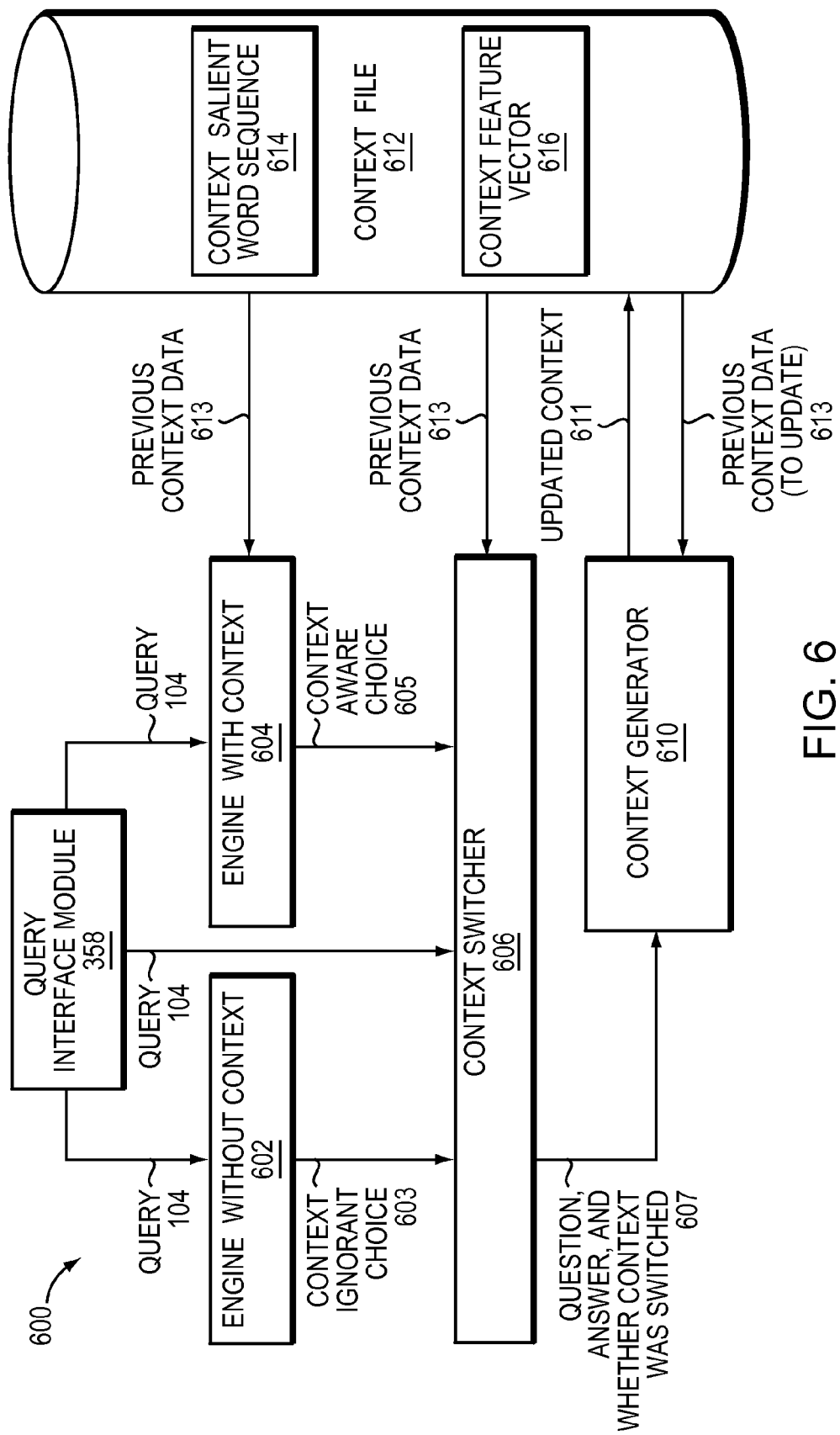
FIG. 6 is a block diagram of a FAQ-based system with context switching.

FIG. 6 is a block diagram 600 of a FAQ-based system with context switching. The FAQ-based system 102 receives a user generated query 104 via a query interface module 358 at an engine without context 602 and an engine with context 604. The context file 612 represents a history of related user generated queries. The FAQ-based system 102 employs the context file 612 to assist the classifier in determining an answer for a user generated query. A context file 612 includes a context salient word sequence 614 in a context feature vector 616. The context salient word sequence 614 begins as a question returned by the classifier in response to a query. As the user asks more queries, the context salient word sequence 614 is the longest common sequence of words behind a most recently returned question by the classifier and the previous context salient word sequence 614. The context feature vector 616 includes a collection of features, such as weighted lexicon features and word counts of common words in questions and a ranked set of answers.

The engine without context 602 receives the user-generated query 104 and generates a context ignorant choice 603 including a context ignorant question, a context ignorant answer, and a context ignorant confidence. The engine with context receives the user-generated query 104 and previous context data 613. Based on the user-generated query 104 and the previous context data 613, the engine with context 604 generates a context aware question, a context aware answer, and a context aware confidence.

A context switcher 606 receives the user generated query 104, a context ignorant choice 603 from the engine without context 602, and a context aware choice 605 from the engine with context 604, and previous context data 613 as inputs. The context switcher determines, based on the user generated query 104, the context ignorant choice, and the context aware choice 605, and the previous context data 613 whether to continue using the current context file 612 or to reset the context file 612 and search with just the user generated query 104. The context switcher 606 sends data 607, such as a question, answer, and whether the context switcher 606 switched the context to the context generator 610.

The context generator 610, based on the data 607 and previous context data 613, generates an updated context 611 and sends the updated context 611 to the context file 612. When the context switcher 606 chooses the context aware choice 605, the context generator uses the previous context data 613 to generate the updated context 611.

Figure 7:
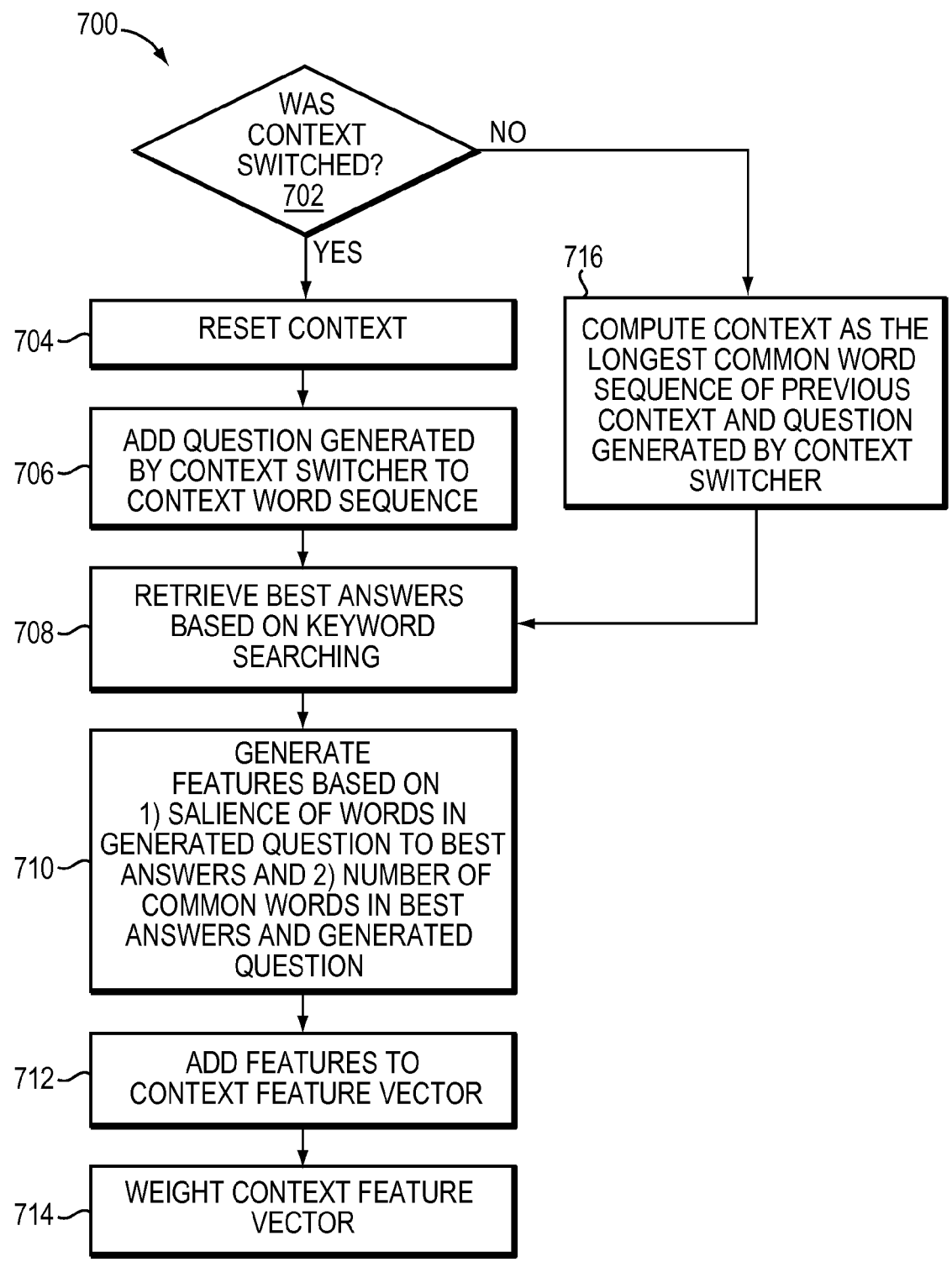
FIG. 7 is a flow diagram of a method employed to run a context generator.

FIG. 7 is a flow diagram 700 of a context generator. The context generator first determines whether the context switcher 606 chose the engine without context 602 over the engine with context 604, effectively changing the context (702). Upon detecting a context switch (702), the context generator 610 resets the context (704) which deletes any information within the context file 612. Then the context generator 610 adds the words of the question into the context salient word sequence 614 of the context file 612 (706).

Upon detecting no context switch (702), the context generator 610 computes a context salient word sequence 614 as a longest common word sequence of the previous salient word sequence 614 and the question generated by the context switcher 606. (716) Then, the context generator retrieves a set of best answers by keyword searching (708) the context salient word sequence 614 generated (706, 716) Next, the context generator generates features based on both 1) the salience of words in the generated question to the retrieved best answers and 2) the number of common words in the retrieved best answers and the generated question (710). Next, the context generator adds (712) the generated features (710) to the context feature vector 616 of the context file 612.

A person of ordinary skill in the art can appreciate that adding the features to the context feature vector 616, in the scenario where the context is switched, adds the features to a blank context feature vector, and in the scenario where the context is not switched, adds the features to a context vector that already contains features. Next, the context generator decreases the weight of the entire context feature vector 616 by a given factor (714). In one embodiment, the given factor is 0.8 out of a maximum of 1.0. Weighting the context feature vector 616 allows for more recently generated contexts to be weighted higher than less recently generated contexts. It should be noted that the higher the weight, the more likely older queries will influence the most recent user generated query.

Figure 8:
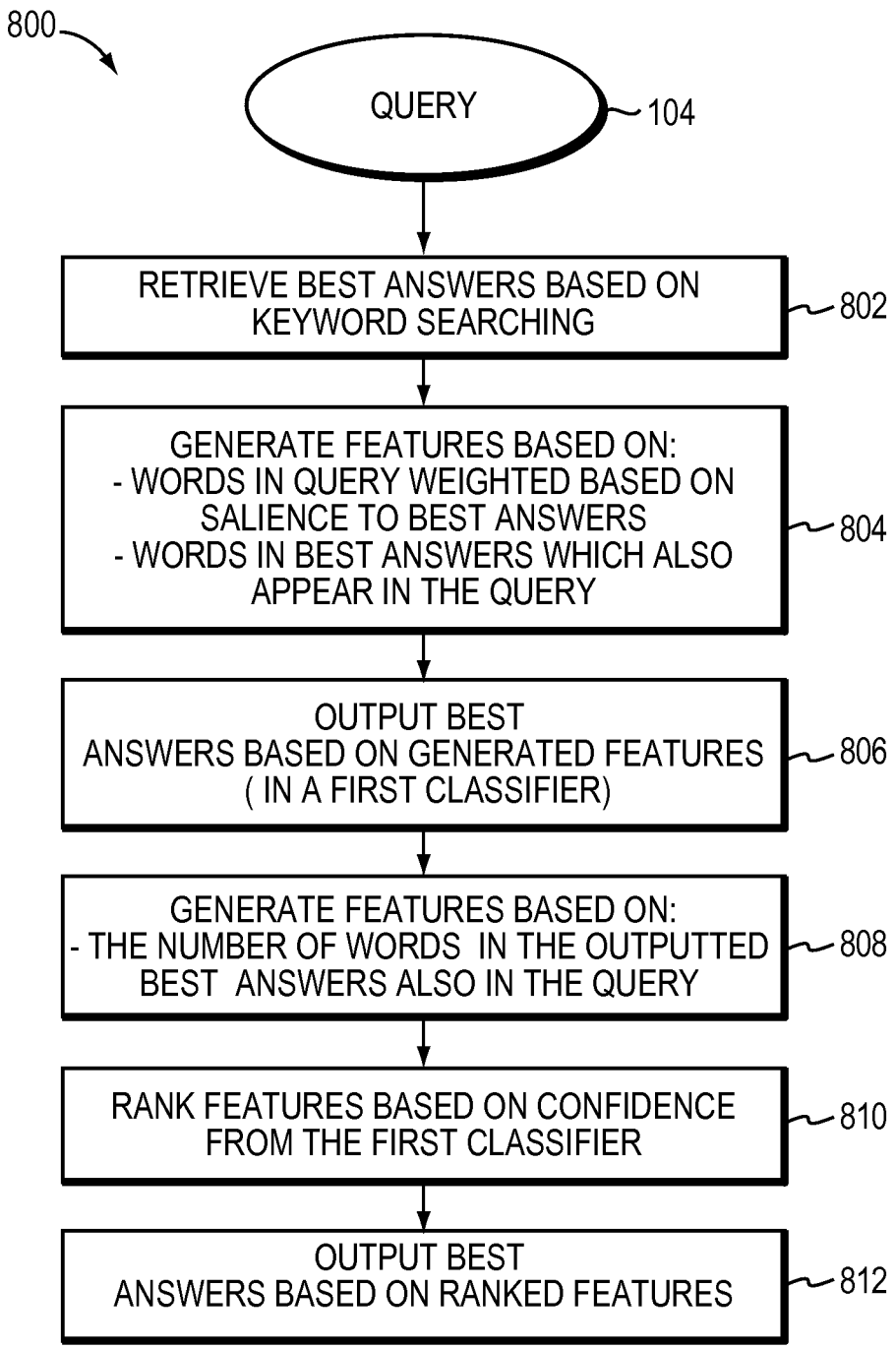
FIG. 8 is a flow diagram of a method optionally employed to run an engine without context.

FIG. 8 is an engine without context flowchart 800. The engine without context 602 receives a user generated query 104 and retrieves a set of best answers based on keyword searching the user generated query 104 (802). The engine without context 602 then generates a first set of features (804) based on 1) words in the user generated query weighted based on salience to the retrieved best answers (802) and 2) words in the retrieved best answers (802) that are also in the user generated query 104. The engine without context 602 then outputs the best answers based on the first set of generated features, using a first classifier (806), which effectively ranks the initial best answers according to the first set of generated features (804). The first classifier also generates confidences for each of the initial best answers (806). The engine without context 602 then generates a second set of features based on the number of words in the outputted best answers that are also in the query (808). The engine without context 602 ranks (810) the second set of generated features (808) based on the confidence generated in the first classifier (806). Then the engine without context 602 outputs the best answers (812) based on the ranked features (810).

Figure 9:
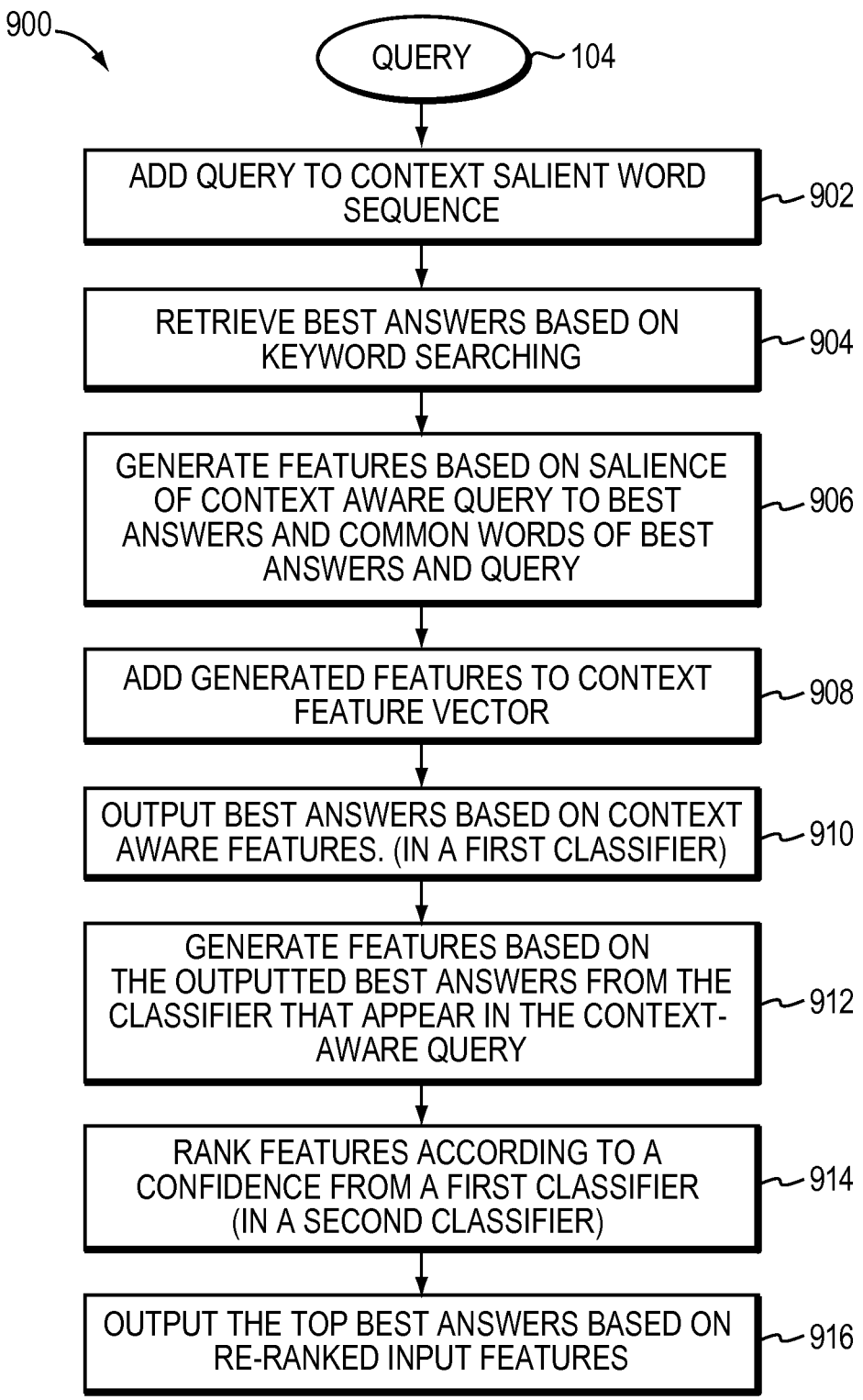
FIG. 9 is a flow diagram of a method optionally employed to run an engine with context.

FIG. 9 is an engine with context flowchart 900. The engine with context 604 receives a user generated query 104, and adds the words of the user generated query 104 to the context salient word sequence 614 of the context file 612 (902). The engine with context 604 then retrieves a set of best answers by keyword searching the context salient word sequence 614 with the words of the user generated query 104 (904). The engine with context 604 then generates a first set of features based on the salience of the context salient wore sequence 614 to the generated best answers and common words of the best answers and the context aware query (906). In other words, the context salient word sequence 614 is compared to the retrieved best answers based on keyword searching generated (904) based on 1) salience and 2) common words among the answers and the context aware query.

Next, the engine with context 604 adds the first set of generated features to the context feature vector 616 of the context file 612 (908). The engine with context 604 then outputs the best answers based on the context aware first set of generated features, using a first classifier (910). The first classifier also generates a confidence for each of the best answers (910). Next, the engine with context 604 generates features based on the number of words in each of the outputted best answers from the classifier that also appear in the context aware query (912). The engine with context 604 then ranks, using a second classifier, the second set of features according to a confidence generated by the first classifier (914). Then the engine with context 604 outputs a set of best answers based on the second set of generated features (916).

Figure 10:
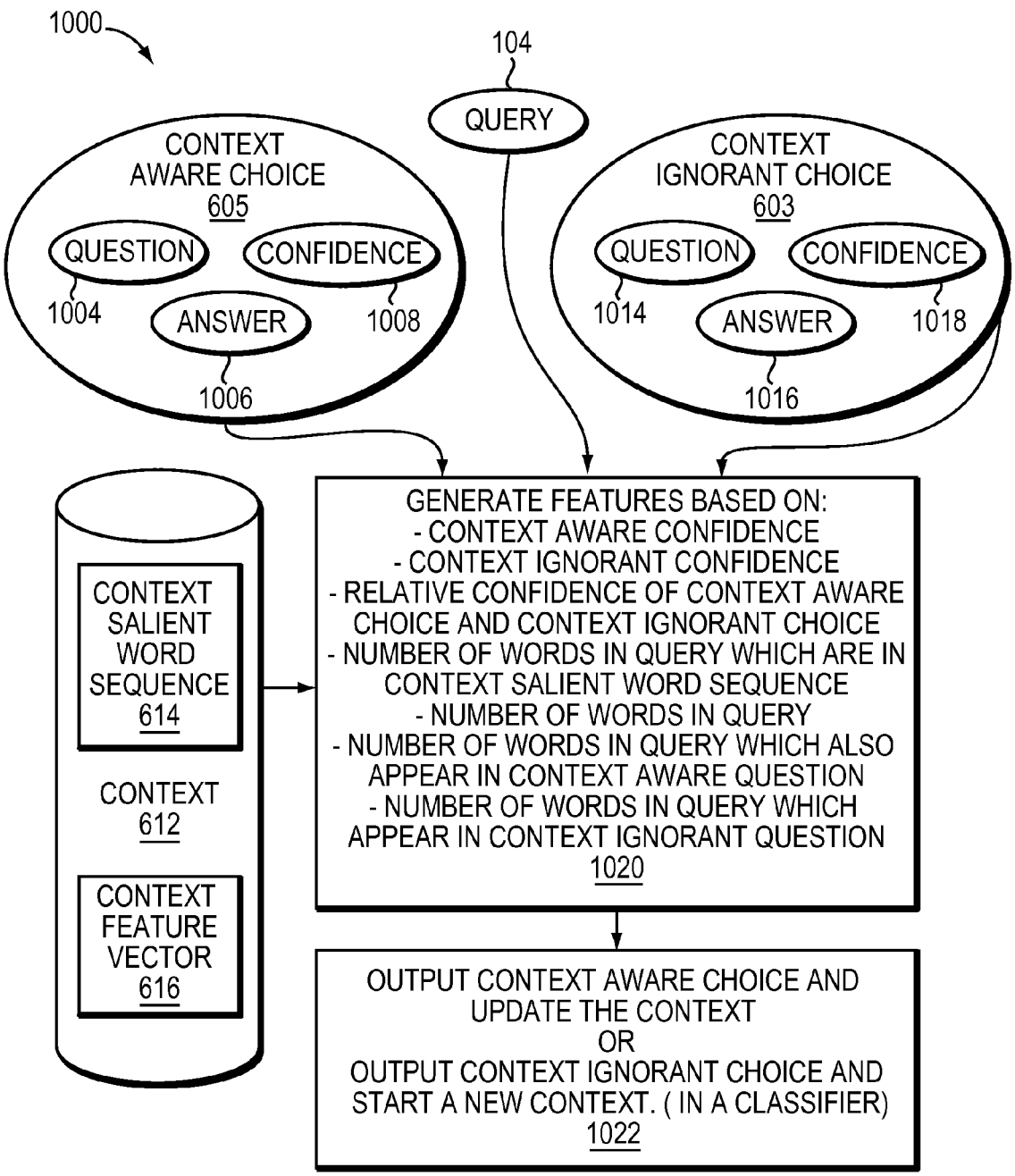
FIG. 10 is block diagram of an embodiment of a context switcher.

FIG. 10 is a block diagram 1000 of an embodiment of a context switcher 606. The context switcher 606 receives a user generated query 104, a context aware choice 605, and a context ignorant choice 603. The context aware choice 605 includes a context aware question 1004, a context aware answer 1006, and a context aware confidence 1008. The context ignorant choice 603 includes a context ignorant question 1014, a context ignorant answer 1016, and a context ignorant confidence 1018. The context switcher 606 also receives the context file 612 as input, which, as previously described, includes the context salient word sequence 614 and the context feature vector 616.

The context switcher 606 generates features (1020) based on the context aware confidence 1008; the context ignorant confidence 1018; the relative confidence of the context aware choice 605 and the context ignorant choice 603; the number of words in the user generated query 104 which are in the context salient word sequence 614; the number of words in the user generated query 104; the number of words in the user generated query 104 which also appear in the context aware question 1004; and the number of words in the user generated query 104 which appear in the context ignorant question 1014. Then, the context switcher either outputs the context aware choice 605 when the context aware confidence 1008 is higher than the context ignorant confidence 1018 or the context ignorant choice 603 when the context ignorant confidence 1018 is higher than the context aware confidence 1008 (1022). When the context switcher outputs the context aware choice 605, it also updates the context file 612 to reflect the context aware choice 605. When the context switcher outputs the context ignorant choice 603, it begins a new context based on the context ignorant choice 603. The context switcher chooses between context aware choice 605 and context ignorant choice 603 within a classifier.

Figure 11:
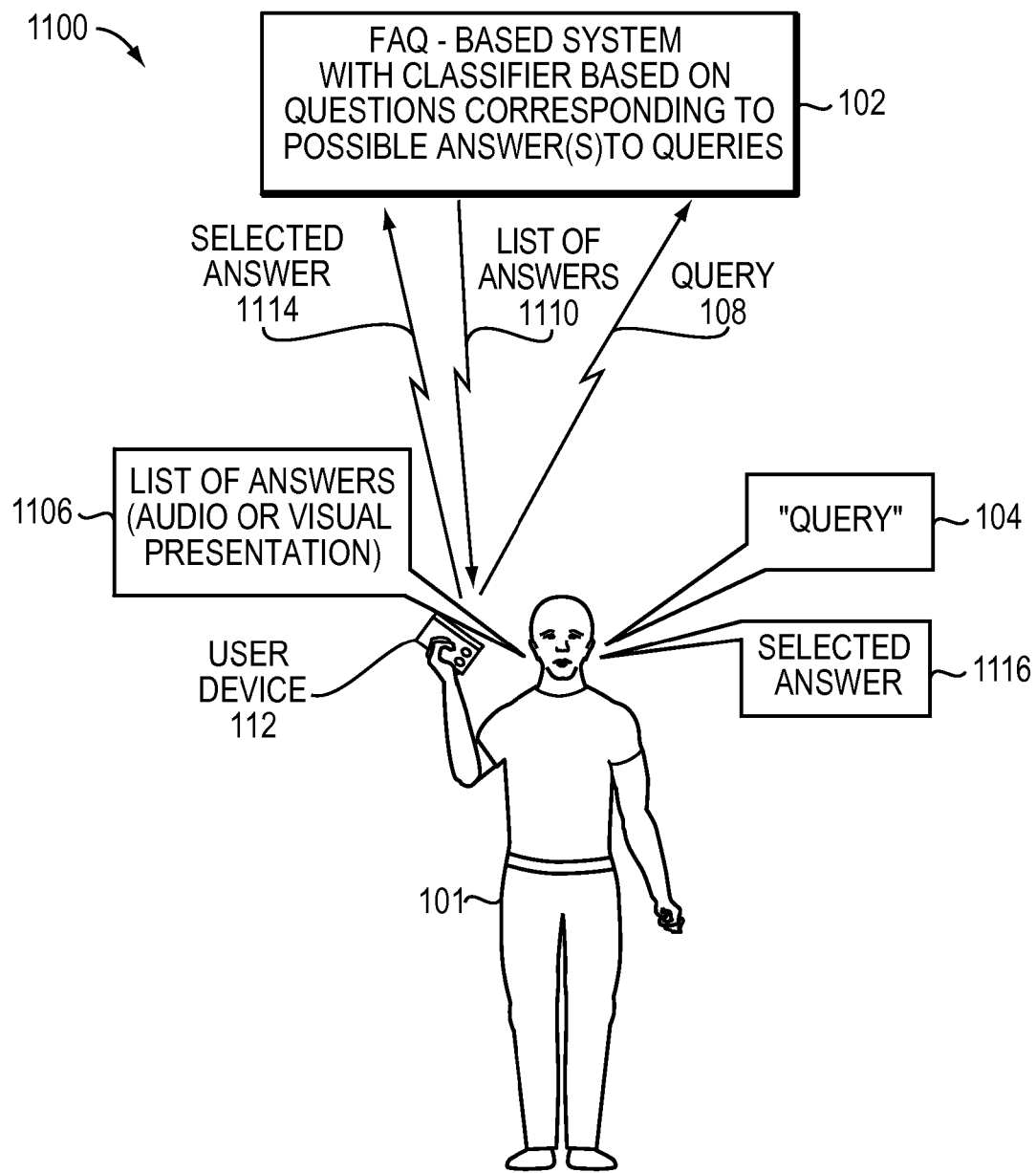
FIG. 11 is a diagram of a user interacting with a FAQ-based system configured to provide feedback learning.

FIG. 11 is a diagram 1100 of a FAQ-based system 102 with feedback learning. This embodiment includes a user 101 with the user device 112 that generates the user generated query 104. The user device 112 sends the transmitted query 108 to the FAQ-based system 102. The FAQ-based system returns a transmitted list of answers 1110 to the user device 112. The user device then displays or presents a list of answers 1106 in either an audio or a visual presentation. The user then enters in a user selected answer 1116 into the user device 112, which transmits a transmitted selected answer 1114 to the FAQ-based system 102. The FAQ-based system then retrains itself based on the transmitted selected answer 1114 which, in effect, gives the user selected answer 1116 a higher weight in future queries that are the same or similar to the user generated query 104.

Figure 12:
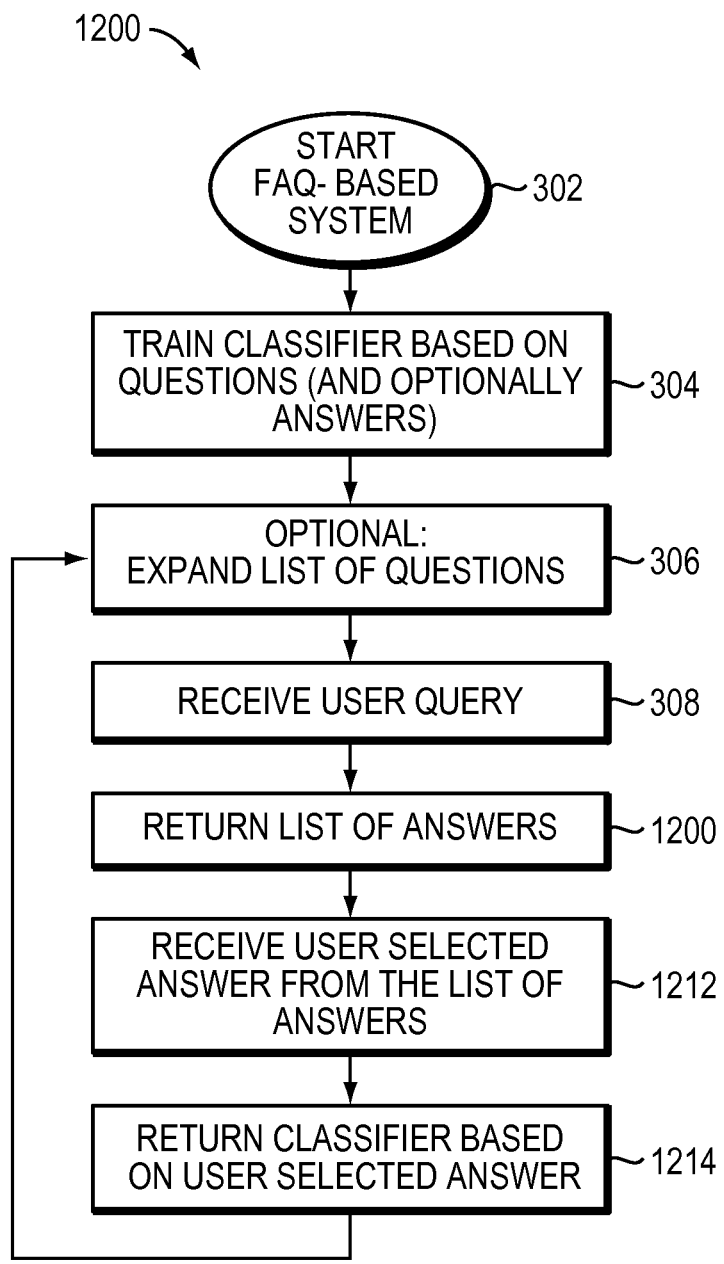
FIG. 12 is a flow diagram to of a method employed to run a FAQ-based system with feedback learning.

FIG. 12 is a FAQ-based system with feedback learning flowchart 1200. Starting the FAQ-based system (302), training the classifier (304), optionally expanding the list of questions (306), and receiving the user query (308) are performed in the same manner as described in reference to FIG. 3. In reference to FIG. 12, however, after receiving the user query, the FAQ-based system 102 returns a list of possible answers for user selection (1210). When the user selects an answer from the list of possible answers, the FAQ-based system 102 receives the user selected answer 1116 from the list of answers and responds accordingly (1212). Then, the FAQ-based system 102 retrains the classifier based on the user selected answer 1116 by giving a higher weight to the user selected answer in regards to the user generated query 104 such that when a similar query is asked in the future, the user selected answer is ranked higher in the list of answers (1214). A person of ordinary skill in the art can recognize that different weights can be applied to the retraining the classifier based on the user selected answer such that a user selection can retrain the classifier differently.

Figure 13:
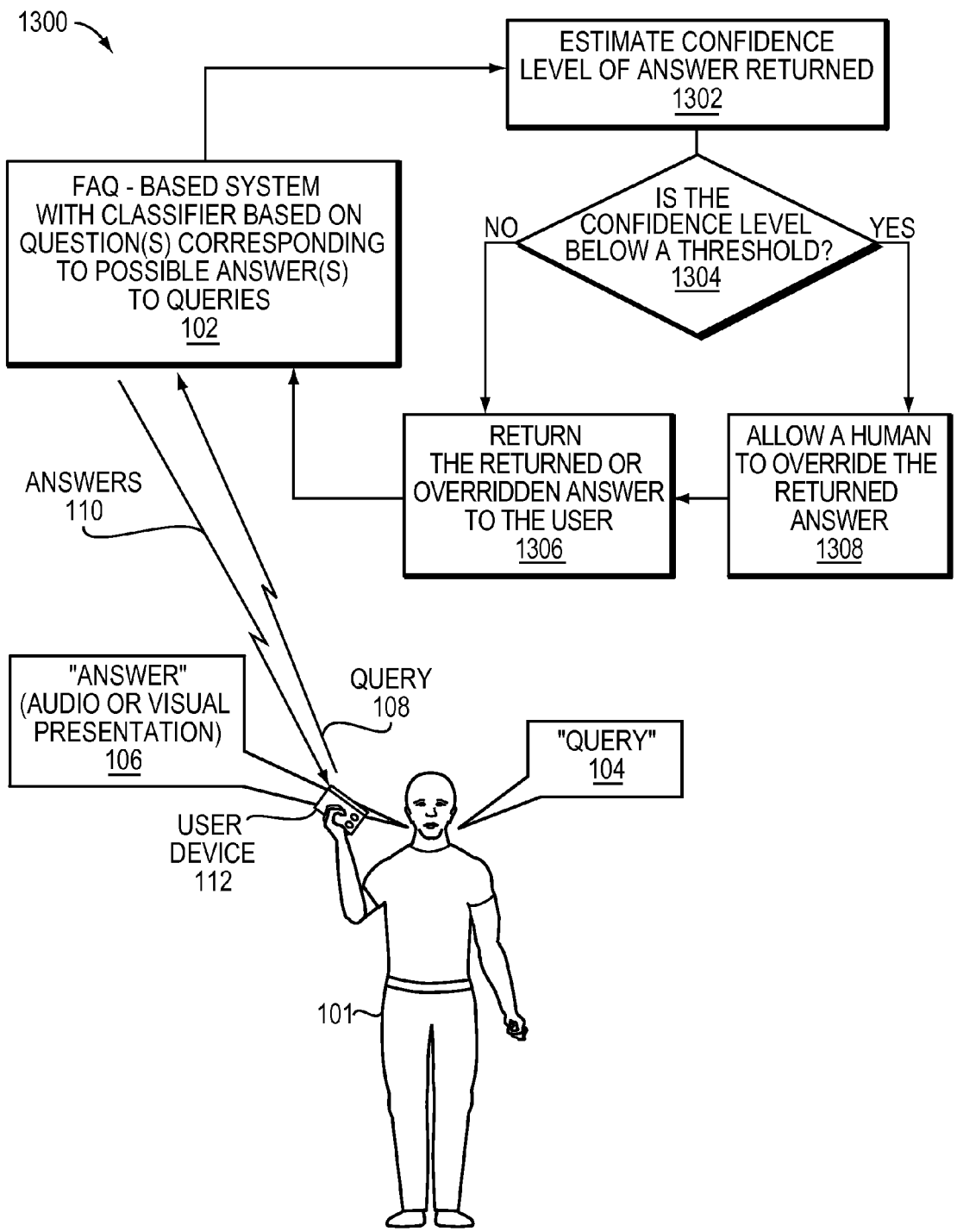
FIG. 13 is a diagram of a user interacting with a FAQ-based system configured to provide confidence checking.

FIG. 13 is a block diagram 1300 of a FAQ-based system with confidence checking. Upon the user generated query 104 and the FAQ-based system 102 receiving the transmitted query 108, the FAQ-based system 102 generates an answer to the user generated question. In this embodiment, the FAQ-based system 102 estimates a confidence level of the answer returned in regards to the user generated query 104 (1302). Then, the FAQ-based system 102 determines whether the estimated confidence is below a given threshold (1304). If the confidence is below a given threshold, the FAQ-based system 102 allows a human or other intervening device to override the returned answer and replace it with a more relevant answer (1308). Then the FAQ-based system 102 returns the overridden answer to the user (1306). If the confidence is not below a given threshold (1304), then the FAQ-based system 102 returns the original returned answer to the user through the FAQ-based system 102 (1306). As in other embodiments, the returned answer is transmitted to the user device 112 through the transmitted answer 110.

Figure 14:
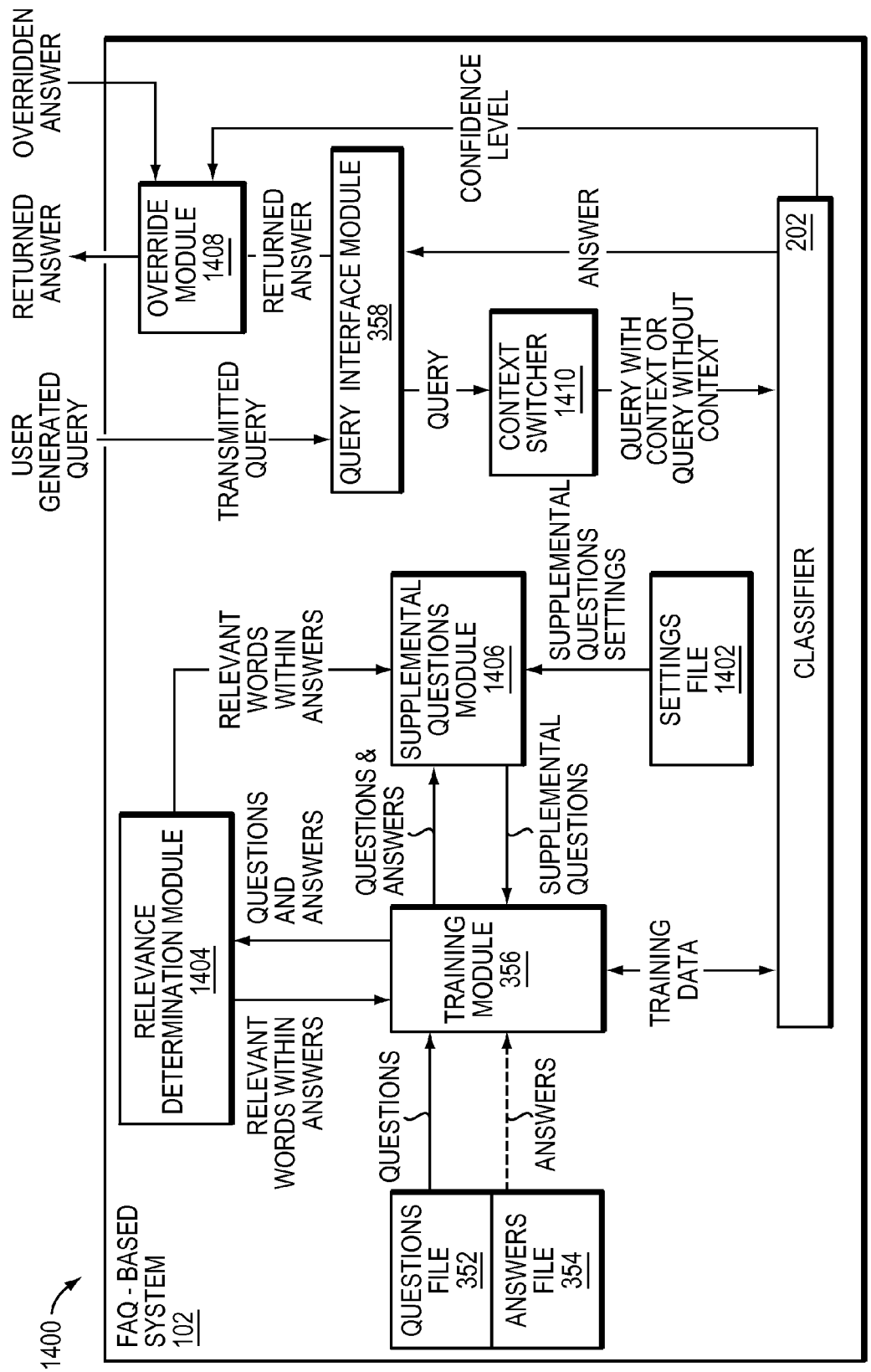
FIG. 14 is a block diagram of a FAQ-based system with supplemental question generation, content switching, and confidence checking.

FIG. 14 is a block diagram 1400 of a FAQ-based system 102 with supplemental question generation, content switching, and confidence checking. The FAQ-based system 102 illustrated in FIG. 14 is similar to the FAQ-based system 102 illustrated in FIG. 3B. The following description highlights the additional features of the FAQ-based system 102 of FIG. 14.

The training module 356 is coupled to multiple elements to receive questions from the questions file 352 and answers from the answers file 354. The training module then trains the classifier 202 based on both the set of questions from the questions file 352 and the set of corresponding answers from the answers file 354. In one embodiment, the training module weights the set of questions more heavily than the corresponding set of answers; however, a person of ordinary skill in the art can appreciate that any weighting can be applied during training.

The training module 356 is further coupled with a relevance determination module 1404. The training module 356 transmits questions and answers to the relevance determination module 1404. The relevance determination module then determines and ranks relevant words within each answer for each question in the set of questions. Relevance of a word in an answer to a question is determined based on factors, including: salience of the word in the answer to the question; distance of the word in the answer to the same word in the question; the number of time the words appears in the answer; and the number of times the word appears in any answer. Salience of the word in the answer to the question can also include relevance, significance, and importance. A person of ordinary skill in the art can recognize that salience can be read throughout the specification to include these factors.

A supplemental questions module 1406 is coupled with the training module, a settings file 1402, and the relevance determination module 1404. The supplemental questions module 1406 receives questions and answers from the training module 356. In another embodiment, the supplemental questions module 1406 directly receives questions and answers from questions file 352 and answers file 354.

The supplemental questions module 1406 is coupled to receive relevant words within answers from the relevance determination module 1404. In one embodiment, the relevant words are ranked by the relevance determination module 1404. In another embodiment, the relevant words are ranked by the supplemental questions module 1406. In either embodiment, the supplemental questions module 1406 generates supplemental questions which are sent to the training module 356. The training module 356 then retrains the classifier 202 based on the supplemental questions 1406.

The supplemental questions module 1406 is coupled to a settings file 1402 to receive supplemental questions settings. The supplemental questions settings may include: (i) how many supplemental questions the supplemental questions module 1406 should generate per question in the set of questions, and (ii) how many additional words the supplemental questions module 1406 should add for each supplemental question.

The query interface module 358 is coupled to output to a context switcher 1410. The context switcher 1410, as described above in reference to FIGS. 6-10, determines whether the classifier 202 should switch context based on the user generated query. The context switcher 1410 outputs the query with context or the query without context to the classifier.

The query interface module 358 is coupled to output to an override module 1408. The query interface module 358 outputs a returned answer to the override module. The override module 1408 is coupled to receive a confidence level from the classifier 202 and determine whether the confidence of the returned answer is below a given threshold. If the answer is below the given threshold, the override module 1408 outputs a returned answer that is an overridden answer. The overridden answer can be entered by a human or other source of answers. If the answer meets or exceeds the given threshold, the override module 1408 outputs the returned answer from the query interface module 358.

Embodiments or aspects of the present invention may be implemented in the form of hardware, software, or firmware. If implemented in software, the software may be any form of software capable of performing operations consistent with the example embodiments disclosed herein. The software may be stored in any non-transient computer readable medium, such as RAM, ROM, magnetic disk, or optical disk. When loaded and executed by processor(s), the processor(s) are configured to perform operations consistent with the example embodiments disclosed herein. The processor(s) may be any form of processor(s) capable of being configured to execute operations as disclosed herein.

While this invention has been particularly shown and described with references to example embodiments thereof, it will be understood by those skilled in the art that various changes in form and details may be made therein without departing from the scope of the invention encompassed by the appended claims.

What is claimed is:

1. A method for operating a frequently asked questions (FAQ)-based system, the method comprising:
   training a classifier primarily based on questions stored in the FAQ-based system, each question corresponding to at least one answer; and
   applying the classifier to a query to return an answer, wherein applying the classifier is performed as a function of a context identified by a given sequence of queries, the classifier determining whether to update the context to reflect a most recent query in the given sequence of queries or reset the context based on an analysis of (i) the most recent query in the given sequence of queries in connection with the context and (ii) the most recent query in the given sequence of queries independent of the context.

2. The method of claim 1, further comprising determining relevance of words with respect to corresponding questions; and
   wherein training the classifier includes providing selected words, selected by a weight that represents the relevance of the words to the questions, as features to the classifier, the selected words being chosen from among the words having higher relevance than other words.

3. The method of claim 1, wherein the questions are preexisting questions, and wherein the method further comprises:
   determining relevance of words within the answers with respect to corresponding questions; and
   automatically generating supplemental questions based on words having higher relevance than other words, the supplemental questions corresponding to answers from which words of the supplemental questions were chosen; and
   wherein training the classifier includes training the classifier based on the preexisting questions and the supplemental questions.

4. The method of claim 3, wherein generating the supplemental questions further includes:
   ranking words within the corresponding answers as a function of relevance to corresponding questions; and
   incorporating a given number of the ranked words into the preexisting questions to create the supplemental questions.

5. The method of claim 4, wherein the given number of ranked words is optionally adjustable or static.

6. The method of claim 1, wherein applying the classifier to return the answer includes returning a plurality of answers to a user.

7. The method of claim 6, further comprising adjusting rankings of the questions corresponding to answers, based on a given answer chosen by the user from among the plurality of answers returned, for use in returning answers to similar or the same queries in the future.

8. The method of claim 1, further comprising enabling receipt of the query from a human user or enabling receipt of the query from a machine user.

9. The method of claim 1, further comprising:
   estimating a confidence level of the answer returned with respect to the query; and
   enabling an override to allow a human to provide an alternative answer in an event the estimated confidence level of the returned answer is below a given threshold.

10. The method of claim 1, wherein the query is a formerly received query, and further including identifying a change in context in the most recently received query and resetting the given sequence of queries, from which the context is based, to begin a new context with the newest query.

11. The method of claim 10, further including applying weightings of decreasing value to words, used as factors for iteratively training the classifier, from within newest queries to within oldest queries in the given sequence of queries.

12. A frequently asked questions (FAQ)-based system comprising:
    a training module configured to train, using a processor, a classifier primarily based on questions stored in a memory of the FAQ-based system, each question corresponding to at least one answer; and
    a query interface module configured to apply the classifier to a query to return an answer, wherein applying the classifier is performed as a function of context identified by a given sequence of queries, the classifier configured to determine whether to update the context to reflect a most recent query in the given sequence of queries or reset the context based on an analysis of (i) the most recent query in the given sequence of queries in connection with the context and (ii) the most recent query in the given sequence of queries independent of the context.

13. The system of claim 12, further comprising:
    a relevance determination module configured to determine relevance of words with respect to corresponding questions;
    wherein the training module is further configured to provide words selected by a weight that represents the relevance of the words to the questions as features to the classifier, the selected words being chosen from among the words having higher relevance than other words.

14. The system of claim 12, wherein the questions are preexisting questions; and further comprising:
    a relevance determination module configured to determine relevance of words within the answers with respect to corresponding questions;
    a supplemental questions generation module configured to generate supplemental questions automatically based on words having higher relevance than other words, the supplemental questions corresponding to answers from which words of the supplemental questions were chosen; and
    wherein the training module is configured to train the classifier based on the preexisting questions and the supplemental questions.

15. The system of claim 14, wherein the supplemental question generation module is further configured to rank words within the corresponding answers as a function of relevance to corresponding questions and incorporate a given number of the ranked words into the preexisting questions to create supplemental questions.

16. The system of claim 15, wherein the given number of ranked words is optionally adjustable or static.

17. The system of claim 12, wherein the query interface module is further configured to return a plurality of answers to a user.

18. The system of claim 17, wherein the training module is further configured to adjust rankings of questions corresponding to answers based on a given answer chosen by the user from among the plurality of answers returned for use in returning answers to similar or the same queries in the future.

19. The system of claim 12, wherein the query interface module is configured to enable receipt of the query from a human user or enable receipt of the query from a machine user.

20. The system of claim 12, wherein the query interface module is configured to estimate a confidence level of the answer returned with respect to the query, and further comprising:

an override module configured to allow a human to provide an alternative answer in the event the estimated confidence level of the returned answer is below a given threshold.

21. The system of claim 12, wherein the query is a formerly received query and further comprising:

a context switcher configured to identify a change in the context in the most recently received query and reset the given sequence of queries from which the context is based to begin a new context with the newest query.

22. The system of claim 21, wherein the context switcher further applies weightings of decreasing value to words used as factors for iteratively training the classifier from within newest queries to within oldest queries in the given sequence of queries.

23. The method of claim 6, wherein training the classifier includes training the classifier in part as a function of a given answer chosen by the user.

24. The method of claim 1, wherein training the classifier further includes determining a highest ranking set of answers, creating features to provide to the classifier based on the queries and words of the highest ranking set of answers.

25. The method of claim 1, wherein the training is based on a combination of questions and answers.

26. The method of claim 25, wherein the training provides a higher weight to the questions than the answers.

27. The system of claim 17, wherein the training module is further configured to train the classifier in part as a function of a given answer chosen by the user.

28. The system of claim 12, wherein the query interface module is configured to determine a highest ranking set of answers and create features to provide to the classifier based on the queries and words of the highest ranking set of answers.

29. The system of claim 12, wherein the training module bases the training on a combination of questions and answers.

30. The system of claim 29, wherein the training module is configured to provide a higher weight to the questions than the answers.

\* \* \* \* \*